United States Patent [19]
Chovanes

[11] Patent Number: 5,721,992
[45] Date of Patent: Feb. 24, 1998

[54] METHOD AND APPARATUS FOR TAKING STILL PICTURES

[76] Inventor: Joseph E. Chovanes, 2162 County Line Rd., Ardmore, Pa. 19003

[21] Appl. No.: 412,166

[22] Filed: Mar. 28, 1995

[51] Int. Cl.⁶ .......................... G03B 17/24; G03B 19/00
[52] U.S. Cl. ............................................. 396/312; 396/429
[58] Field of Search ............................... 354/75, 76, 105, 354/106, 109; 396/312, 429

[56] References Cited

U.S. PATENT DOCUMENTS

| | | | |
|---|---|---|---|
| 4,905,029 | 2/1990 | Kelley | 354/76 |
| 4,983,996 | 1/1991 | Kinoshita | 354/76 |
| 5,099,262 | 3/1992 | Tanaka et al. | 354/106 |
| 5,128,700 | 7/1992 | Inoue et al. | 354/76 |
| 5,276,472 | 1/1994 | Bell et al. | 354/76 |
| 5,313,235 | 5/1994 | Inoue et al. | 354/76 |
| 5,359,374 | 10/1994 | Schwartz | 354/76 |
| 5,387,955 | 2/1995 | Cocca | 354/76 |
| 5,489,955 | 2/1996 | Satoh et al. | 354/76 |

OTHER PUBLICATIONS

Advertising Brochure, VoicePrint.
The Sharper Image Catalog, p. 146, May 1995.
Best Catalog, p. 13.

Primary Examiner—Safet Metjahic
Assistant Examiner—Nicholas J. Tuccillo

[57] ABSTRACT

A device and process for recording sound to an integrated circuit is disclosed at about the time a picture is being taken, in order to later review the sound while viewing the picture.

1 Claim, 5 Drawing Sheets

METHOD AND APPARATUS FOR TAKING STILL PICTURES

FIELD OF THE INVENTION

This invention relates to the picture taking art. More particularly, this invention relates to an improved method and apparatus for taking pictures.

BACKGROUND OF THE INVENTION

Various ways of taking pictures are known in the art. The usual distinction is between moving pictures, both film and video, and still pictures. Still pictures are usually divided between instant film (i.e., the picture develops before the user's eyes) and film that needs to be developed (i.e., removing the film in cartridge or other form from the camera and developing it by oneself or having a third party develop the film.) When the film is developed it is run through a series of chemical baths to bring out the image imprinted through the camera. This creates a negative, which is then projected onto light sensitive paper, through an enlarger. The paper is then run through a series of chemicals in turn, and the completed image appears thereon. This final version is what is commonly referred to as a picture, and may then be cut or shaped if desired.

In an instant picture much of this process is in the film packaging itself. The image is cast upon a photosensitive surface in a discrete piece of film. The film is mounted in a frame and contains the chemicals needed to transform the image containing film unit into a picture suitable for viewing. After the picture is taken the film package is ejected from the camera, and development begins. Within a short time development is complete and the picture is ready for viewing. The period from capturing the image to full viewing suitability may be as little as seconds.

Commonly used moving pictures may be created by a process similar to still film, that is taking the image, then developing the film, or videotape, which involves capturing images on magnetic media. These images are then available for immediate viewing.

One final area of interest is the taking of still pictures on media other than film. This can be magnetic media such as a floppy disk. The pictures are then viewable as still pictures with some sort of conversion apparatus, such as a computer or magnetic media reader, or they can be printed directly.

Pictures taken with a camera are usually taken through a shutter, shutter release, and lens system. The shutter acts to block light from reaching the film which is mounted behind the lens so that the image cannot be formed on the film until the user is ready. When the shutter release is activated, the shutter will open for a usually predetermined length of time, and light will pass through and form the image on the film.

It is possible to associate sound with moving pictures through a separate recording track. However, a simple and useful method for associating sound with still pictures has not heretofore been available.

Thus it is an object of the present invention to permit, simply and economically, the recording of sound at about the time the picture is taken.

SUMMARY OF THE INVENTION

The present invention discloses both method and apparatus for utilizing a recording integrated circuit, along with a microphone, to record sound when taking pictures. The integrated circuit may be attached directly to the picture at the time of taking or after the picture has been developed. It may then be played back when desired, usually when viewing the picture.

DETAILED DESCRIPTION OF THE PREFERRED EMBODIMENT

Figure 1:
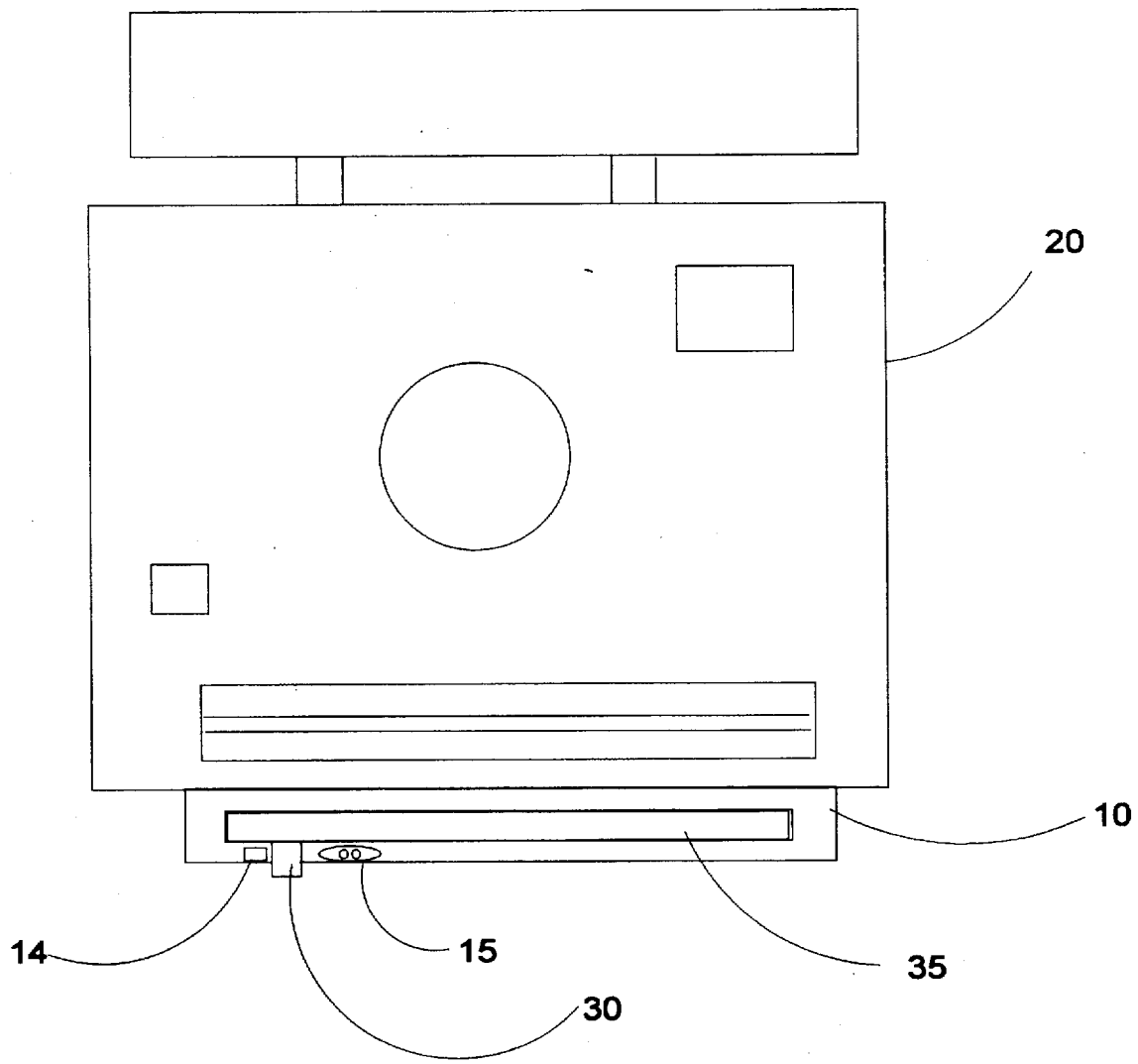
FIG. 1 is a schematic drawing of a front elevational view of a preferred embodiment.

At FIG. 1 is seen a preferred embodiment of the invention, utilized on an instant camera such as a Polaroid One Step Flash. Holder 10, a lightweight box made of commercially available plastic, is mounted on the outside bottom of camera body 20, using any conventional means, such as double sided tape.

Microphone 15, which is a conventional, directional type of microphone is installed in the holder 10. Also seen is tab 30 connected to the pack 35. The pack 35 is retained within holder 10 in a matter described below. Its recording capability is activated by recording switch 14 in a matter described below.

Figure 3:
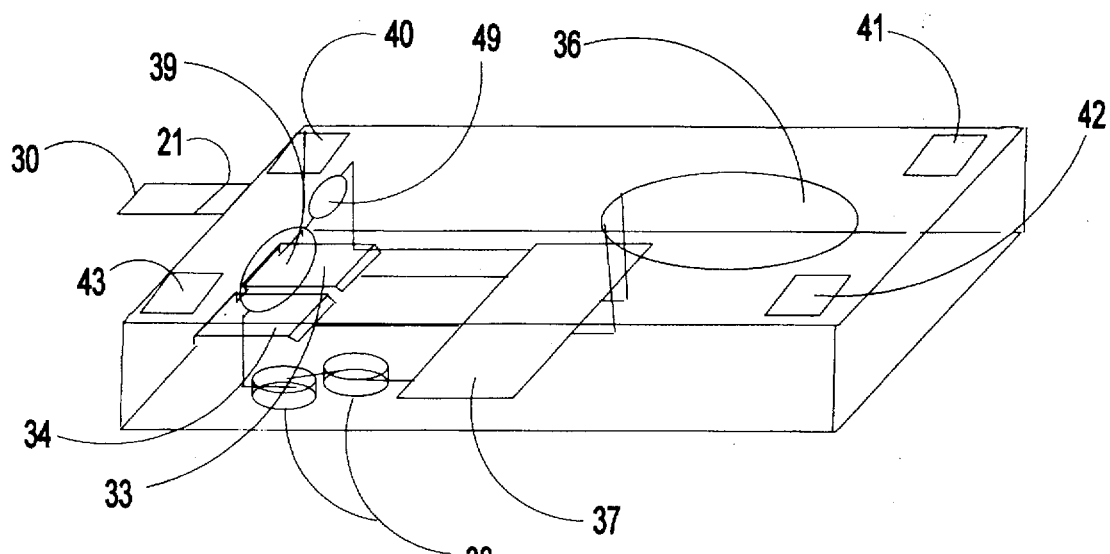
FIG. 3 is a perspective view, partially in phantom, of a preferred embodiment.

FIG. 3 shows the pack 35 with its various components. Speaker 36 is connected to a recording and playable integrated circuit (IC) chip 37, which in turn is connected to power source 38. In this embodiment, the power source comprises commonly available alkaline cells, such as hearing aid batteries. The power source 38 is connected in turn to playback switch 39, which when pressed will activate the playback section of the IC chip.

Figure 2:
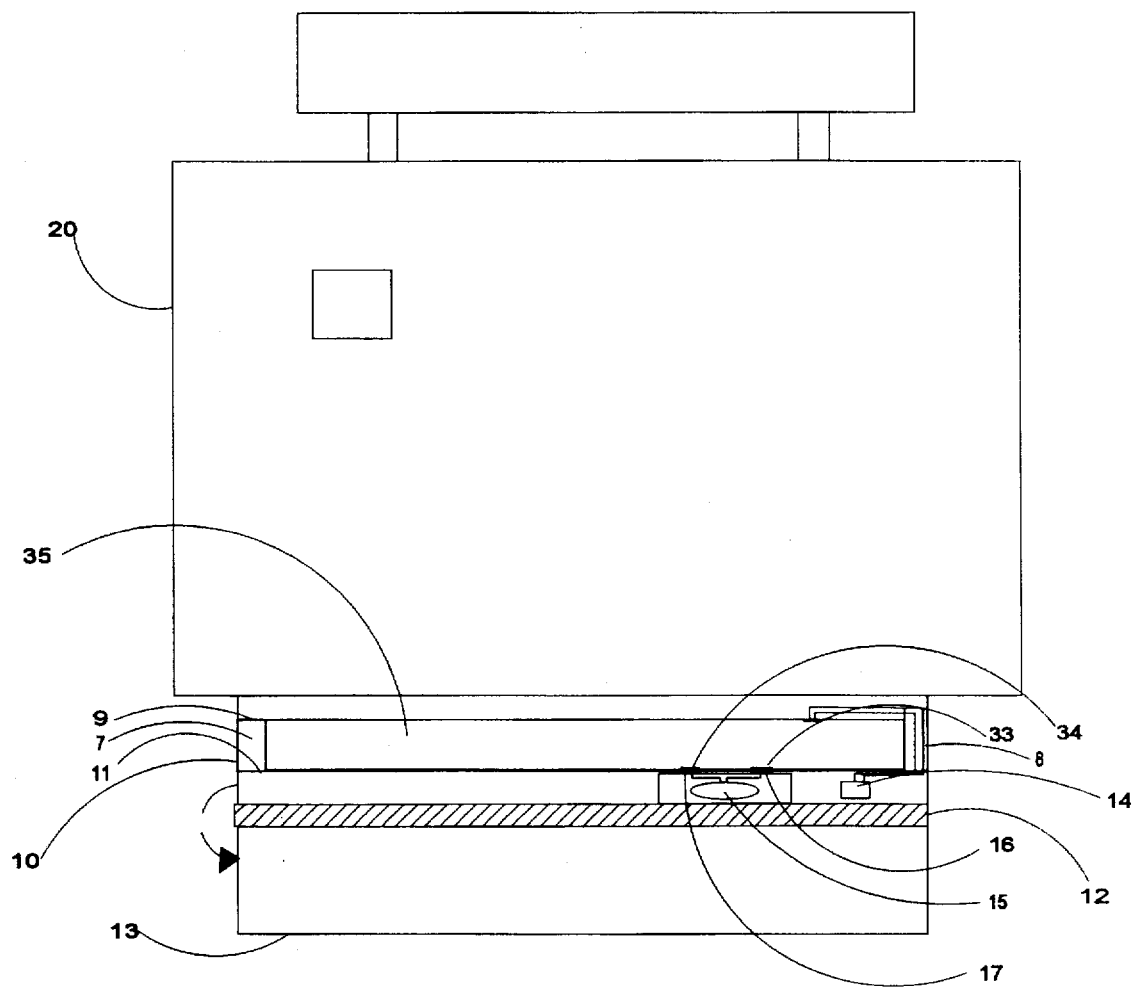
FIG. 2 is a schematic drawing of a rear elevational view of a preferred embodiment.

Indented leads 33 and 34 are shown on the bottom of the pack. When the pack is installed in the holder 10, as seen in FIG. 2, the leads 33 and 34 are connected to leads 16 and 17 depending from microphone 15. The leads 16 and 17 extend upwardly into the indent formed on pack 35 by leads 33 and 34, and help secure pack 35 in holder 10. The connection between the leads also serves to makes the electrical connection between the microphone 15 and the IC chip 37, so that pressing recording switch 14 will close recording contacts 49a and 49b on the pack 35, and the sound picked up by the microphone 15 will be transmitted through the leads and recorded on the chip 37. Recording can occur at any time around the taking of the picture by pressing switch 14. This may be before the taking, so that the subjects can say something and then pose, during the taking, or after the shutter release is pressed and the picture is taken. It is most desirable, in this embodiment, to record at a time substantially contemporaneously to the picture being taken. The sound will then meaningfully correspond with the image. This would be within 10 seconds before, during, or within 10 seconds after taking the picture. Other embodiments may have greater or lesser windows of time, which would be whatever is desirable before or after the picture is taken.

In the instant camera the embodiment is attached to, the picture is ejected immediately after being taken. This permits, when the picture is developed, attachment of the pack to the picture.

The IC chip used in this embodiment has a recording time of about two seconds. Use of the recording time can be controlled by a variable timer switch if desired. Alternatively, the IC chip can have a greater or lesser recording time, which again can be utilized by an off-on switch or a variable timer switch. It might be desirable as well, to separate the recording component from the combined recording and playback IC chip on the pack. This would permit playback only from the pack which might desirably decrease the size and cost of the pack as it would contain only a playback IC chip. A separate recording IC chip or mechanism might desirably be placed near the microphone or in the holder. If the embodiment is one internal to the camera, as described below, the recording mechanism could desirably be placed in or on the camera.

Once recorded, the pack 35 can be pulled out by tab 30 from the front of the camera. (see FIG. 1). Playback switch 39 can be pressed to ensure the sound is satisfactory, and if it is the backing can be peeled off the attachment areas 40, 41, 42 and 43 in a manner not shown. This will permit attachment to the picture immediately, or if the user desires, after the picture develops. The pack is sized to be about the same dimensions of the picture in this embodiment for ease of handling, although a smaller or larger size may be desired. Once the pack is attached, tab 30 can be torn along scored line 21 to reduce its size and to facilitate handling.

Figure 4:
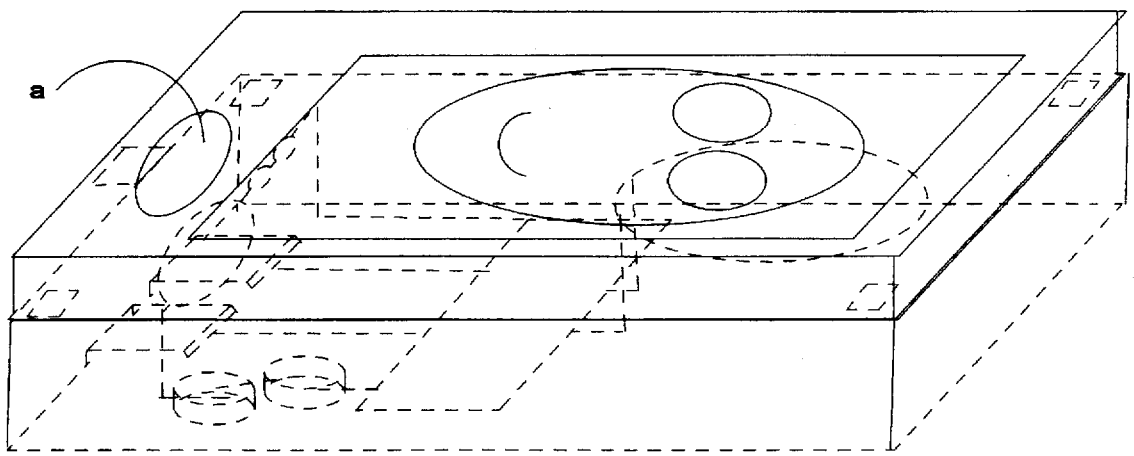
FIG. 4 is a perspective view, partially in phantom, of a preferred embodiment.

At FIG. 4, the pack is shown attached to the picture. When the area a on the picture is pressed, the force is transmitted to playback switch 39, which actuates the chip 37 and plays the sound back.

The pack in this embodiment is a lightweight plastic box, within and on which the various components are mounted. A perforated section, not shown, covers the speaker, to allow clear sound transmission.

An alternative embodiment has the components embedded within a substrate such as a rosin or epoxy, as long as any movable pieces, for example, possibly the recording and playback switches and the speaker, are free to move. Additionally, the substrate must be inert, i.e. not interfere with any electrical connections. Again, it may be desirable to have this type of embodiment approximately the same size as the picture, although a smaller or larger size may be desirable. It may even be desired to incorporate the invention into a substrate that will serve as the backing for the image or film, so the image and the invention are contained on and within an unitary object.

In order to ensure the satisfactory recording of the sound desired, the user can press switch 39 before attaching the pack to the picture. This will play back the recorded message through speaker 36. If the message is not desirable the user can feed the pack 35 back into the holder 10, and press switch 14 to re-record the message. It is also possible, in an embodiment not shown, to have a playback switch on the holder or incorporated within the camera, and play the message back before pulling the pack out, thus making sure it is satisfactory.

The power supply may also be made replaceable in a manner not shown. As the memory in this embodiment needs power to maintain the recording, it might be desirable to provide for a removable and replaceable power source, capable of maintaining power to the memory while being replaced, if necessary, as for example another power supply on a separate card.

The embodiment shown has a single holder, which can be reused by insertion of another pack. At FIG. 2 is shown the pack 35 as retained within the holder 10, between shelves 9 and 11 and walls 7 and 8. To re record a pack, or insert a new pack, the rear of the holder 13, which is constructed to fit snugly onto the remainder of the holder, is swung down along hinge 12 as shown by the dotted line and arrow, and a new pack (or the same pack, if re-recording is desired) inserted. As an alternative embodiment, the holder could be adapted to take multiple packs, which could then be recorded when desired. In addition, other switch embodiments might be used. For example in the case of an external holder, a membrane type switch might be desirably placed over the shutter release so that it is only necessary to press one switch area.

As another alternative, the pack or packs could be affixed internally to the film pack or camera, thus obviating the need for two switches to be pressed because the pack or packs could be maintained directly in the camera or film pack, without the external holder used in the above embodiment. In this alternative, it might be desirable to enable use beforehand, as by a separate trigger, as there may be some occasions where the user would not desire recording while taking a picture.

The manual ejection system might be replaced by an automatic ejection system as well, or if the packs are merged with the film pack internally, the pack could be ejected separately or with the picture, in either a manual or automatic fashion. Such an ejection choice or system might well depend whether the recording is actuated for any particular photograph.

An alternative embodiment as well, might involve a delay between switch actuation and recording, in order to permit the picture taker to get in the picture for example, much as a timer works on a camera. A delay of some period of time between picture taking and recording or between recording and picture taking might also be desirable so as to prevent the taking of the picture while mouths are open and speaking. Moreover, an indicator light or lights, or a separate IC sound chip as well might desirably be included. These would be mounted so that they can be viewed by the subjects and would go off immediately before the recording time, so that the subjects know when to make the sounds to be recorded.

Figure 5:
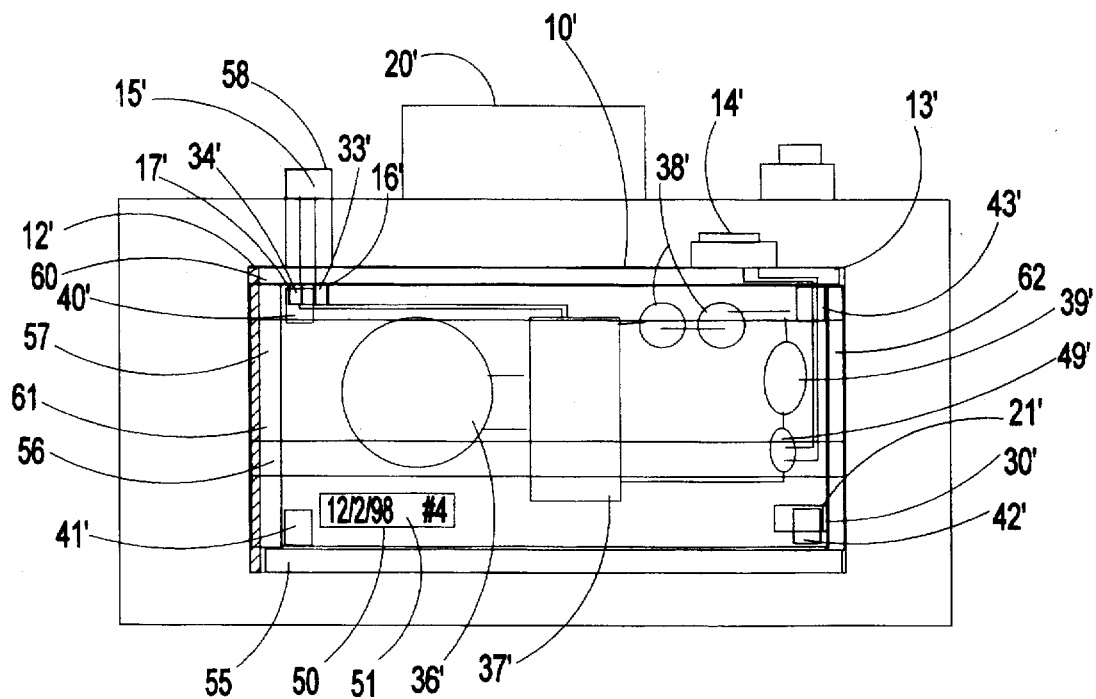
FIG. 5 is a schematic drawing of a rear elevational view, partially in phantom, of a preferred embodiment.

Another embodiment, seen at FIG. 5, is suitable for placement on the back of a camera such as a 35 mm single lens reflex (SLR). This illustrates how it is possible to place an external holder anywhere on a camera, if desired, or even, if desired, freestanding or on another object, such as a tripod or flash unit. (In FIG. 5, numbers with a prime symbol have been used to denote components which are generally the same in structure and function as those in the embodiment seen in FIGS. 1 through 4.)

The camera is shown generally at 20'. The microphone 15' is housed within microphone housing 58. Again this may be a conventional directional type of microphone, although generally any microphone capable of picking up the desired sounds to be recorded clearly can be used with the present invention. The microphone housing 58 may be configured so as to be specialized for various brand names of cameras, or may be generally configured for any camera. Leads 16' and 17' travel from the microphone to connect with the pack 35' at 33' and 34' (see below).

The holder 10' has retained within it pack 35'. Pack 35' is secured by stops 55, 56, 57, 60, 61 and 62, which are comprised of a resilient material such as neoprene, which serves to retain the pack 35' snugly. Leads 16' and 17' are mounted on stop 57.

Hinge 12' opens the holder 10'. The rear of the holder 13' which is constructed to fit snugly when closed, will swing along hinge 12' for removal of the retained pack or insertion of a pack. The tab 30' is attached with score line 21' to facilitate removing the pack. The pack will be pulled directly outwards, away from the camera back.

Pack leads 33' and 34' are connected to the play and record IC chip 37' used in this embodiment, as are playback switch 39' and recording contacts 49a' and 49b'. The recording contacts 49a' and 49b' are activated by switch 14' which is pressed at the time recording is desired.

Because this embodiment may be used on a non-instant camera, manual recording of the date and picture is provided to enable future matching up of the picture with the pack, after the picture is developed. Thus area 51 is provided on the pack to enable writing of notes, which in this case were the date and picture number as shown by the camera's indicator. Open area 50 is provided through the holder in order to enable writing on area 51. It would also be possible to have this recording be done automatically by a time, date or number stamp process.

In a SLR camera with a "hot shoe" or indeed any camera with a hot shoe or similar component, triggering of an embodiment might be desirably actuated by the hot shoe. The device could in turn be provided with a pass through hot shoe of its own, so that a flash unit might still be used.

The above description and the view depicted by the figures are for purposes of illustration only and are not intended to be, and should not be construed as, limitations on the invention.

Moreover, certain modifications or alternatives may suggest themselves to those skilled in the art upon reading of this specification, all of which are intended to be within the spirit and scope of the present invention as defined in the attached claims.

I claim:

1. A device for recording and playing back sound comprising a recording and playback integrated circuit, a microphone, a speaker, a power source, a recording switch and a playback switch and a retention means adapted for mounting underneath a photographic image mounted on a substrate, whereby said microphone is utilized to record sound to said recordable and playback integrated circuit upon activation of said recordable switch, and said playback switch activates said playback integrated circuit to playback sound through said sound generation means, with said power source powering the recording and playback IC chip, and with said playback switch being located underneath said substrate so that activation occurs with pressure on said substrate.

* * * * *